United States Patent
Yamada et al.

(10) Patent No.: US 7,035,709 B2
(45) Date of Patent: Apr. 25, 2006

(54) SYSTEM AND METHOD FOR PREPARATION OF TOOLING SHEET, AND PROGRAM FOR PREPARATION OF TOOLING SHEET

(75) Inventors: Masato Yamada, Ogaki (JP); Jun Oki, Toride (JP)

(73) Assignee: Mitsubishi Materials Corporation, Tokyo (JP)

(*) Notice: Subject to any disclaimer, the term of this patent is extended or adjusted under 35 U.S.C. 154(b) by 0 days.

(21) Appl. No.: 10/760,459

(22) Filed: Jan. 21, 2004

(65) Prior Publication Data

US 2004/0215363 A1    Oct. 28, 2004

(51) Int. Cl.
*G06F 19/00* (2006.01)

(52) U.S. Cl. .................. 700/169; 700/179; 483/15

(58) Field of Classification Search ............. 700/179, 700/102; 705/26, 27; 483/15
See application file for complete search history.

(56) References Cited

U.S. PATENT DOCUMENTS 4,584,649 A * 4/1986 Komanduri et al. ........ 700/173
6,064,982 A * 5/2000 Puri ............................ 705/27
6,219,586 B1 * 4/2001 Sakai ......................... 700/182

* cited by examiner

*Primary Examiner*—Leo Picard
*Assistant Examiner*—Sheela S. Rao
(74) *Attorney, Agent, or Firm*—Oblon, Spivak, McClelland, Maier & Neustadt, P.C.

(57) ABSTRACT

An optimum cutting tool is selected interactively in a cutting tools selection section, and a tooling sheet using the selected cutting tool is generated and output in a tooling sheet preparation section. The cutting tool selection section searches a cutting tool database using a unique order number for each cutting tool as a search key, and outputs a list of cutting tool search results, and when a declaration of intention to select an insert via the list is made, parameters indicating the recommended cutting conditions for the designated cutting tool are transferred to the tooling sheet preparation section. The tooling sheet preparation section generates and outputs tooling sheet item data for some items by computation with a prescribed formula, based on the transferred parameters. As a result, an accurate, interchangeable, and readily expandable system for the preparation of tooling sheets can be provided.

13 Claims, 15 Drawing Sheets

FIG. 5A

| EXTERNAL TURNING | ▽ |
|---|---|
| EXTERNAL TURNING BORING | |
| FACE MILLING | |
| END MILLING DRILLING | |

FIG. 5B

| | SEARCH |
|---|---|

FIG. 5C

| NOT SPECIFIED | ▽ |
|---|---|
| NOT SPECIFIED | |
| FACE MILLING | |
| SHOULDER MILLING | |

FIG. 5D

| NOT SPECIFIED | ▽ |
|---|---|
| NOT SPECIFIED | |
| GENERAL CUTTING | |
| FINISHING<br>HEAVY CUTTING<br>HIGHFEED<br>SPECIAL (DIFFICULT-TO-CUT MATERIALS)<br>QING | |

FIG. 5E

| NOT SPECIFIED | ▽ |
|---|---|
| NOT SPECIFIED<br>MILD STEEL<br>CARBON STEEL, ALLOY STEEL<br>HIGH ALLOY STEEL | |
| STAINLESS STEEL | |
| CAST IRON<br>DUCTILE CAST IRON<br>ALUMINUM ALLOY STEEL<br>COPPER, COPPER ALLOYS<br>NON-FERROUS METAL<br>HEAT-RESISTANT ALLOY<br>TITANIUM ALLOY<br>HARDENED STEEL | |

FIG. 6A

| ASX445/FACE MILLING | | | | | | | | | | | | | | | | | |
|---|---|---|---|---|---|---|---|---|---|---|---|---|---|---|---|---|---|
| TYPE | ORDER NUMBER | NUMBER OF STOCK | | | NUMBER OF TEETH | EFFECTIVE DIAMETER D | MAXIMUM EDGE DIAMETER D1 | INNER CUTTING DIAMETER | | HEIGHT H | MOUNT | | | KEY WAY | | CUTTER WEIGHT (kg) | MAXIMUM DEPTH OF CUT |
| | | L | N | R | | | | D1 | D2 | | d | h1 | d1 | w | t | | |
| COARSE PITCH | ASX445-050A03R | – | – | ● | 3 | 50 | 63 | – | – | 40 | 22 | 20 | 11 | 10.4 | 6.3 | 0.5 | 6 |
| FINE PITCH | ASX445-050A04R | – | – | ● | 4 | 50 | 63 | – | – | 40 | 22 | 20 | 11 | 10.4 | 6.3 | 0.4 | 6 |
| COARSE PITCH | ASX445-063A04R | – | – | ● | 4 | 63 | 75.9 | – | – | 40 | 22 | 20 | 11 | 10.4 | 6.3 | 0.7 | 6 |

FIG. 6B

BRP /FACE MILLING

| TYPE | ORDER NUMBER | NUMBER OF STOCK | | | NUMBER OF TEETH | EFFECTIVE DIAMETER D | MAXIMUM DIAMETER D1 | INNER CUTTING EDGE DIAMETER D2 | HEIGHT H | MOUNT | | | KEY WAY | | CUTTER WEIGHT (kg) | MAXIMUM DEPTH OF CUT |
|---|---|---|---|---|---|---|---|---|---|---|---|---|---|---|---|---|
| | | L | N | R | | | | | | d | h1 | d1 | w | t | | |
| CUTTING EDGE R6 | BRP6P-040A03R | - | - | ● | 3 | 27.8 | 40 | - | 40 | 16 | 18 | - | 8.4 | 5.6 | 0.4 | JUNE 4TH |
| CUTTING EDGE R8 | BRP8P-063A04R | - | - | ● | 4 | 46.7 | 63 | - | 50 | 22 | 20 | 11 | 10.4 | 6.3 | 0.7 | MAY 5TH |

FIG. 6C

QBF407/QING SYSTEM

| TYPE | ORDER NUMBER | NUMBER OF STOCK | | | NUMBER OF TEETH | EFFECTIVE DIAMETER D | MAXIMUM DIAMETER D1 | INNER CUTTING EDGE DIAMETER | | HEIGHT H | MOUNT | | | KEY WAY | | CUTTER WEIGHT (kg) | MAXIMUM DEPTH OF CUT |
|---|---|---|---|---|---|---|---|---|---|---|---|---|---|---|---|---|---|
| | | L | N | R | | | | D1 | D2 | | d | h1 | d1 | w | t | | |
| – | QBF407R 0304Q | – | – | ● | 4 | 80 | 82.8 | – | – | 50 | 25.4 | 26 | – | 8.8 | 7 | 1.2 | – |
| – | QBF407R 0406Q | – | – | ● | 6 | 100 | 102.8 | – | – | 63 | 31.75 | 29 | – | 8.8 | 7 | 2 | – |
| – | QBF407R 0508Q | – | – | ● | 8 | 125 | 127.7 | – | – | 63 | 38.1 | 29 | – | 12.8 | 7 | 2.9 | – |

FIG. 6D

ASX445/FACE MILLING

| TYPE | ORDER NUMBER | NUMBER OF STOCK | | | NUMBER OF TEETH | EFFECTIVE DIAMETER D | MAXIMUM DIAMETER D | INNER EDGE DIAMETER D1 | CUTTING DIAMETER D2 | HEIGHT H | MOUNT | | | KEY WAY | | CUTTER WEIGHT (kg) | MAXIMUM DEPTH OF CUT |
|---|---|---|---|---|---|---|---|---|---|---|---|---|---|---|---|---|---|
| | | L | N | R | | | | | | | d | h1 | d1 | w | t | | |
| COARSE PITCH | SE445R/ L0304C | – | – | ● | 4 | 80 | 102.2 | – | – | 50 | 25.4 | 26 | 13 | 9.5 | 6 | 1.6 | 5.5 |
| FINE PITCH | SE445R/ L0306C | – | – | ● | 6 | 80 | 102.2 | – | – | 50 | 25.4 | 26 | 13 | 9.5 | 6 | 1.6 | 5.5 |

FIG. 7

| GENERAL CUTTING |
| FACE MILLING |
| ASX445 |

PRECISE BUT INEXPENSIVE MOLDED
TYPE 20° POSITIVE INSERT
● A WIDE RANGE OF CHIP BREAKERS
● SCREW-ON TYPE
● HIGH RIGIDITY DUE TO EMPLOYMENT
  OF A CARBIDE SHIM

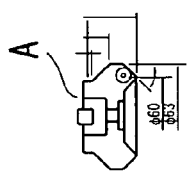

INSERT SELECT   PURCHASE

| TYPE | ORDER NUMBER | NUMBER OF STOCK | | | NUMBER OF TEETH | EFFECTIVE DIAMETER | MAX. DIAMETER | INNER CUTTING EDGE DIAMETER | | HEIGHT | MOUNT | | | KEY WAY | | CUTTER WEIGHT (Kg) | MAX. DEPTH OF CUT | DIMENSIONAL DRAWING |
|---|---|---|---|---|---|---|---|---|---|---|---|---|---|---|---|---|---|---|
| | | L | N | R | | D | D1 | D1 | D2 | H | d | h1 | d1 | w | t | | | |
| COARSE PITCH | ASX445-050A03R | – | – | ● | 3 | 50 | 63 | – | – | 40 | 22 | 20 | 11 | 10 | 6.3 | 0.5 | 6 | FIG. 2 |

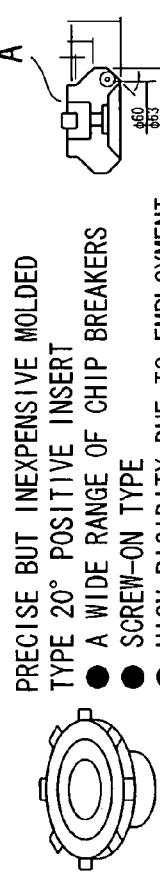

| (1) SHIM | (2) SHIM SCREW | (3) CLAMP SCREW | WRENCH (INSERT) | WRENCH (SHIM) |
|---|---|---|---|---|
| STASX445N | WCS503507H | TPS35 | TIP15T | MKY 35R |

FIG. 8

| CHIP BREAKER | | | COATED | | | CERMET | CARBIDE | CUTTING CONDITIONS | | DIMENSIONS (mm) | | | |
|---|---|---|---|---|---|---|---|---|---|---|---|---|---|
| SHAPE | ORDER NUMBER | TOLERANCE | F7030 | F5010 | AP15TF | MX4546 | HT110 | GEOMETRY | INSCRIBED CIRCLE d | THICKNESS s | WIDTH OF WIPER EDGE f | CORNER RADIUS r |
| ▢ | SEET13T3AGEN-JL (4) | E | ● | | ● | ● | | 45° / 20° | 13.4 | 3.97 | 1.9 | 1.5 |
| ▢ | SEMT13T3AGSN-JM | M | ● | ● | ● | ● | | 45° / 20° | 13.4 | 3.97 | 1.9 | 1.5 |
| ▢ | SEMT13T3AGSN-JH | M | | ● | | | | 45° / 20° | 13.4 | 3.97 | 1.9 | 1.5 |
| ▢ | SEGT13T3AGFR-JP | G | | | | | ● | 45° / 20° | 13.4 | 3.97 | 2.2 | — |

FIG. 9

| | WORKPIECE | HARDNESS | GRADE | CUTTING SPEED (m/min) |
|---|---|---|---|---|
| P | MILD STEEL (EG XXXXX) | ≤180HB | F7030 | 200[180~250] |
| | | | NX4545 | 180[130~230] |
| | CARBON STEEL, ALLOY STEELS (EG XXXXX) | 180~280HB | F7030 | 160[120~200] |
| | | | NX4545 | 150[120~180] |
| | | 280~350HB | F7030 | 120[100~150] |
| | | | NX4545 | 100[80~120] |
| | HARDENED STEEL | ≥40HRC | AP15TF | 80[80~100] |
| M | STAINLESS STEEL (EG XXXXX) | ≤270HB | F7030 | 180[130~250] |
| | | | NX4545 | 150[120~180] |
| | NICKEL BASE ALLOY (EG XXXXX) | — | AP15TF | 40[20~50] |
| K | CAST IRON (EG XXXXX) | TENSILE STRENGTH ≤450N/mm² | AP151F | 180[130~250] |
| | | | F5010 | 200[150~250] |
| | ALUMINUM ALLOY | — | HTi10 | 650[300~1000] |

FIG. 10

| ORDER NUMBER | GRADE | INSCRIBED CIRCLE | THICKNESS | WIDTH OF WIPER EDGE | CORNER RADIUS | CUTTING SPEED | FEED PER TOOTH | PRICE | ADD TOOL DATA |
|---|---|---|---|---|---|---|---|---|---|
| SEET13T3AGEN-JL | F7030 | 13.4 | 3.97 | 1.9 | 1.5 | 160 | 0.15 | 1,090 YEN | PURCHASE |

| TOOL NO. | MACHINING PROCESS NAME | TOOL NAME | DRAWING | TOOL DIAMETER mm | NUMBER OF TEETH | CUTTING SPEED m/min | FEED m/tooth | REVOLUTION min-1 | TABLE FEED mm/min | DEPTH OF CUT (ap) mm | CUTTING LENGTH mm | MACHINING TIME min | OPERATING TIME min | INSERT REPLACEMENT | PRICE |
|---|---|---|---|---|---|---|---|---|---|---|---|---|---|---|---|
| 1 | FACE MILLING | ASX445-063A04R SEET13T3AGEN-JLF7030 |  | 63 | 4 | 160 | 0.15 | 809 | 485 | 1 | 500 | 62 | 3 | 0 | 41,160 YEN |

FIG. 12

TOOLING SHEET

| WORK | DRAWING NUMBER | DATE OF PREPARATION | PREPARED BY |
|---|---|---|---|
| TEST WORK | YC12345C | 2001.06.06 | OOKI |

| | | | | | | | | | | | | | | | MACHINING TIME | 11 HOURS 19 MINUTES | |
|---|---|---|---|---|---|---|---|---|---|---|---|---|---|---|---|---|---|

| TOOL NO. | MACHINING PROCESS NAME | TOOL NAME | DRAWING | TOOL DIAMETER mm | NUMBER OF TEETH | CUTTING SPEED m/min | FEED mm/tooth | REVOLUTION min-1 | TABLE FEED mm/min | DEPTH OF CUT (ap) mm | CUTTING LENGTH mm | MACHINING TIME min | OPERATING TIME min | INSERT REPLACEMENT | PRICE |
|---|---|---|---|---|---|---|---|---|---|---|---|---|---|---|---|
| 1 | FACE MILLING | ASX445-163A04R SEET13T3AGEN-JLF7030 | 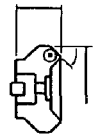 | 63 | 4 | 160 | 0.15 | 809 | 485 | 1 | 500 | 62 | 3 | 0 | 41,160 YEN |
| 3 | SLOT MILLING (ROUGHING) | BAP300R254S25 APMT1135PDER-M2F7030 | 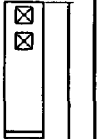 | 25 | 4 | 150 | 0.15 | 1,911 | 1,147 | 6 | 120 | 6 | 3 | 0 | 38,000 YEN |
| 4 | COPYING (ROUGHING) | SRM2200SNM SRG20CAP15TF SRG20EAP15TF | 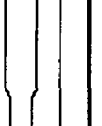 | 20 | 2 | 170 | 0.10 | 2,707 | 541 | 0.5 | 2,000 | 222 | 3 | 1 | 42,500 YEN |
| 7 | SLOT MILLING (FINISHING) | SZE4200SG |  | 20 | 4 | 82 | 0.10 | 1,300 | 510 | 1 | 500 | 59 | 3 | 0 | 31,500 YEN |
| 5 | COPYING (FINISHING) | RMH100S12 RMT10AP15TF | 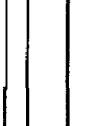 | 10 | 2 | 60 | 0.10 | 1,911 | 382 | 0.4 | 2,000 | 315 | 3 | 2 | 30,150 YEN |

SYSTEM AND METHOD FOR PREPARATION OF TOOLING SHEET, AND PROGRAM FOR PREPARATION OF TOOLING SHEET

BACKGROUND OF THE INVENTION

1. Field of the Invention

The present invention relates to a system and method for the preparation of tooling sheets, and a program for the preparation of tooling sheets, involving generating tooling sheets wherein the recommended cutting conditions for the cutting tool comprising a combination of the tool body, the insert, and material of the insert, are recorded.

2. Description of the Related Art

Rotating cutting tools are generally employed when conducting machining process such as planar cutting and the like on the surface of the work. These rotating cutting tools include, those where the tool body and the cutting edge are integrated, or those where an indexable insert formed with a cutting edge is fitted to the tool body with a bolt or wedge mechanism and the like, such that it may be freely fitted and removed.

The latter requires assembly of the tool when selecting the cutting tool, so that the optimum cutting tool can be selected only when the tool body, the insert, and material of the insert have been determined. Conventional practice has been to examine catalogs supplied by manufacturers, or to search cutting tool databases, and to select the optimum combination on the basis of the experience and skill of the designer, in consideration of cutting conditions.

However, in the case of the aforementioned conventional method of tool selection, the selection criteria depend upon the experience and skill of the designer and are therefore unreliable. Furthermore, even when the tool body is of the same series, changes in its specifications also change the cutting conditions due to the combination. It is therefore difficult to optimize cutting conditions associated with changes in specifications, and the tooling sheet to which the result is output, cannot reflect the optimum cutting conditions.

The present invention takes into consideration the aforementioned situation with an object of providing a system and method for the preparation of tooling sheets, and a program for the preparation of tooling sheets, wherein interactive selection of the optimum cutting tools, and automatic preparation of tooling sheets using selected cutting tools, are possible. Moreover, it is an object of the present invention to provide a system and method for the preparation of tooling sheets, and a program for the preparation of tooling sheets, wherein the combination of the tool body, the insert, and the material of the insert are reflected in the recommended cutting conditions, and the recommended conditions for the selected tools may be modified as desired in response to the conditions of use of the user.

SUMMARY OF THE INVENTION

To resolve the aforementioned problems, the present invention is a system for the preparation of tooling sheets involving generating tooling sheets wherein the recommended cutting conditions for a cutting tool comprising a combination of the tool body, an insert, and the material of the insert are recorded, and is characterized in that there is provided; a cutting tool selection device which interactively selects cutting tools in accordance with a previously defined method, and a tooling sheet preparation device which defines the recommended cutting conditions for the selected cutting tools as a default, and reflects these details in a tooling sheet.

Furthermore, in the present invention the tooling sheet preparation device reflects recommended cutting conditions which are updated by changing the selected cutting tools, in the tooling sheet.

Moreover, in the present invention, the cutting tool selection device comprises; a cutting tool database search device which searches a cutting tool database using at least one of; a unique order number for each of the cutting tools, a cutting purpose, and a material of the work, as a search key, and outputs a search result list for the cutting tools; and a parameter transfer device which transfers parameters indicating the recommended cutting conditions for the designated cutting tools, to the tooling sheet preparation device, by making a declaration of intention to select the insert via the search results list.

Furthermore, in the present invention, the cutting tool database search device displays the search results in order, based on an nth step key allocated to each grouped family of cutting tools.

Moreover, in the present invention the tooling sheet preparation device comprises; a computing device which receives the transfer of the recommended cutting condition parameters via the parameter transfer device, and depending on the item, computes a prescribed formula to thereby generate and output item data of the tooling sheet.

Furthermore, in the present invention, the tooling sheet preparation device comprises a recommended cutting conditions modifying device which modifies recommended cutting conditions for the selected cutting tool, in response to the conditions of use of the user.

In the aforementioned configuration, the optimum cutting tool is selected interactively with the cutting tool selection device, and the tooling sheet using the selected cutting tools is generated and output by the tooling sheet preparation device. The cutting tool selection device searches the cutting tool database using at least the unique order number for each cutting tool, the cutting purpose, or the material of the work, as a search key, and outputs a list of search results for the cutting tool, and transfers parameters indicating the recommended cutting conditions for the designated cutting tool to the tooling sheet preparation device by making a declaration of intention to select the insert via the list of search results. The tooling sheet preparation device, based on the accepted parameters, and depending on the item, computes a prescribed formula to thereby generate and output item data of the tooling sheet By so doing, the combination of the tool body, the insert, and the material of the insert are reflected in the recommended cutting conditions. Moreover, since the recommended conditions for the selected tools may be modified as desired in response to the conditions of use of the user, an accurate, interchangeable, and readily expandable system for the preparation of tooling sheets can be provided.

The tooling sheet displays the recommended cutting conditions for the selected cutting tool (the tool body, the insert, and the material of the insert) in tabular format. Various items such as; drawings, tool diameter, number of teeth, cutting speed, feed, revolution, table feed, cutting depth, cutting length, machining time, operating time, insert replacement, and price, are set in the tooling sheet for each cutting tool. Those with the aforementioned items are computed automatically by the tooling sheet preparation device, and other items are input as desired, or are generated automatically, and the tooling sheet then output. Moreover, the recommended cutting conditions defined as defaults are here cutting speed and feed (per tooth).

Furthermore, to resolve the aforementioned problems, the present invention is a method for the preparation of tooling sheets involving generating tooling sheets wherein recommended cutting conditions for a cutting tool comprising a combination of the tool body, the insert, and the material of the insert are recorded, and involves; interactively selecting the cutting tool in accordance with a previously defined method, and defining the recommended cutting conditions for the selected cutting tool as a default, and reflecting these details in the tooling sheet.

Moreover, to resolve the aforementioned problems, the present invention is a program for the preparation of tooling sheets employed in a system for the preparation of tooling sheets involving generating tooling sheets wherein the recommended cutting conditions for the cutting tool comprising a combination of the tool body, the insert, and the material of the insert are recorded, which executes on a computer; a cutting tool selection step for interactively selecting the cutting tool in accordance with a previously defined method, and a tooling sheet preparation step for defining the recommended cutting conditions for the selected cutting tools as a default, and reflecting these details in the tooling sheet.

Furthermore, the tooling sheet preparation step includes a step for reflecting the recommended cutting conditions which are updated by changing the selected cutting tool, in the tooling sheet, and this step is executed on a computer.

Moreover, the cutting tools selection step includes; a cutting tool database search step for searching a cutting tool database using at least one of; a unique order number for each of the cutting tools, a cutting purpose, and a material of the work, as a search key, and outputting a search result list for the cutting tool; and a parameter transfer step for transferring parameters indicating recommended cutting conditions for a designated cutting tool, to the tooling sheet preparation device, by making a declaration of intention to select the insert via the search results list and these steps are executed on a computer.

Furthermore, in the present invention, the cutting tool database search step includes a step for displaying the search results in order, based on an nth step key allocated to each grouped family of cutting tools, and this step is executed on a computer.

Moreover, in the present invention, the tooling sheet preparation step includes a step for receiving the transfer of the recommended cutting condition parameters, and depending on the item, computing a prescribed formula to thereby generate and output item data of the tooling sheet, and this step is executed on a computer.

Furthermore, in the present invention, the tooling sheet preparation step includes of a step for modifying recommended cutting conditions for the selected cutting tool, in response to the conditions of use of the user, and this step is executed on a computer.

BRIEF DESCRIPTION OF THE DRAWINGS

FIG. 5A is an example of a display screen to explain the operation of the embodiment of the present invention shown in FIG. 1.

FIG. 5B is an example of a display screen to explain the operation of the embodiment of the present invention shown in FIG. 1.

FIG. 5C is an example of a display screen to explain the operation of the embodiment of the present invention shown in FIG. 1.

FIG. 5D is an example of a display screen to explain the operation of the embodiment of the present invention shown in FIG. 1.

FIG. 5E is an example of a display screen to explain the operation of the embodiment of the present invention shown in FIG. 1.

FIG. 6A is an example of a display screen to explain the operation of the embodiment of the present invention shown in FIG. 1.

FIG. 6B is an example of a display screen to explain the operation of the embodiment of the present invention shown in FIG. 1.

FIG. 6C is an example of a display screen to explain the operation of the embodiment of the present invention shown in FIG. 1.

FIG. 6D is an example of a display screen to explain the operation of the embodiment of the present invention shown in FIG. 1.

FIG. 7 is an example of a display screen to explain the operation of the embodiment of the present invention shown in FIG. 1.

FIG. 8 is an example of a display screen to explain the operation of the embodiment of the present invention shown in FIG. 1.

FIG. 9 is an example of a display screen to explain the operation of the embodiment of the present invention shown in FIG. 1.

FIG. 10 is an example of a display screen to explain the operation of the embodiment of the present invention shown in FIG. 1.

FIG. 12 is a diagram to explain a system for the preparation of tooling sheets of the present invention, being an example of a tooling sheet.

DETAILED DESCRIPTION OF THE INVENTION

Figure 1:
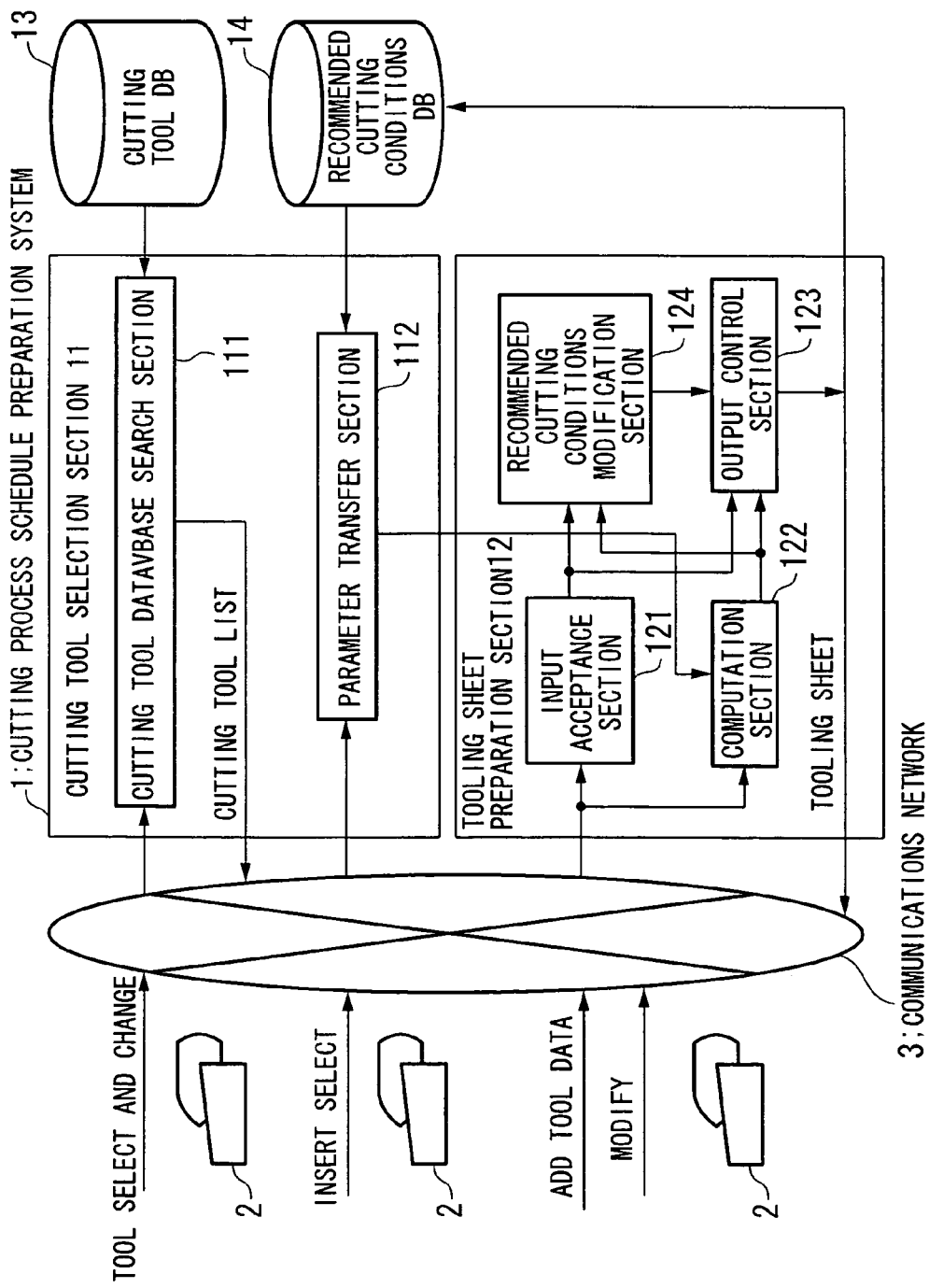
FIG. 1 is a diagram to explain a system for the preparation of tooling sheets of the present invention, and its connection state.

FIG. 1 is a diagram to explain a system for the preparation of tooling sheets of the present invention, and its connection state.

Reference symbol 1 indicates an embodiment of the system for the preparation of tooling sheets of the present invention, showing its internal configuration developed in response to function. The blocks shown below are constituted by peripheral LSIs including CPU and memory. The CPU sequentially reads and executes the program stored in memory to thereby implement the functions of the blocks.

The system for the preparation of tooling sheets of the present invention 1 comprises a cutting tool selection section 11, and a tooling sheet preparation section 12.

The cutting tool selection section 11 has a function to interact with a user to select cutting tools in accordance with a previously defined method via a communications network 3 such as the internet and the like, and comprises a cutting tool DB (database) search section 111, and a parameter transfer section 112.

The cutting tool DB search section 111 searches the cutting tool DB 13 using at least one of the unique order number for each cutting tool, the cutting purpose, and the material of the work, as a search key, and outputs a list of cutting tool search results. The user makes a declaration of intention of selecting an insert via the list of search results output by the cutting tool DB search section 111, and the parameter transfer section 112 reads the parameters indicating the recommended cutting conditions for the designated cutting tool from a recommended cutting conditions DB 14, and transfers the parameters to a tooling sheet preparation section 12.

The cutting tool DB search section 111 is one which displays search results in order, based on the nth step key (n being an integer of 1 or greater) allocated to each grouped family of cutting tools.

The tooling sheet preparation section 12 has a function to reflect recommended cutting conditions data defined as a default, in the tooling sheet. The tooling sheet preparation section 12 has a function to reflect recommended cutting conditions data updated when the selected cutting tools are changed with the cutting tool selection section 11, in a tooling sheet.

The tooling sheet preparation section 12 comprises an input acceptance section 121, a computation section 122, an output control section 123, and a recommended cutting conditions modification section 124.

The input acceptance section 121 accepts additions to a library and requests for modification, and accepts input data for items provided by the user, and supplies these to an output control section 123. The computation section 122 accepts the transfer of recommended cutting conditions data via the parameter transfer section 112, generates item data for the tooling sheet by computation using a prescribed formula, and outputs the item data to the output control section 123. The recommended cutting conditions modification section 124 modifies the recommended cutting conditions for the selected cutting tools in response to the conditions of use of the user, and registers the recommended cutting conditions in the recommended cutting conditions DB 14. The output control section 123 obtains output data from the input acceptance section 121, the computation section 122, and the recommended cutting conditions modification section 124, accesses the recommended cutting conditions DB 14, and outputs the obtained data to user terminal equipment 2 via the communications network 3.

The aforementioned system for preparation of tooling sheets 1 of the present invention is connected to the user terminal equipment 2 via a communications network 3 including the internet and the like.

Figure 2:
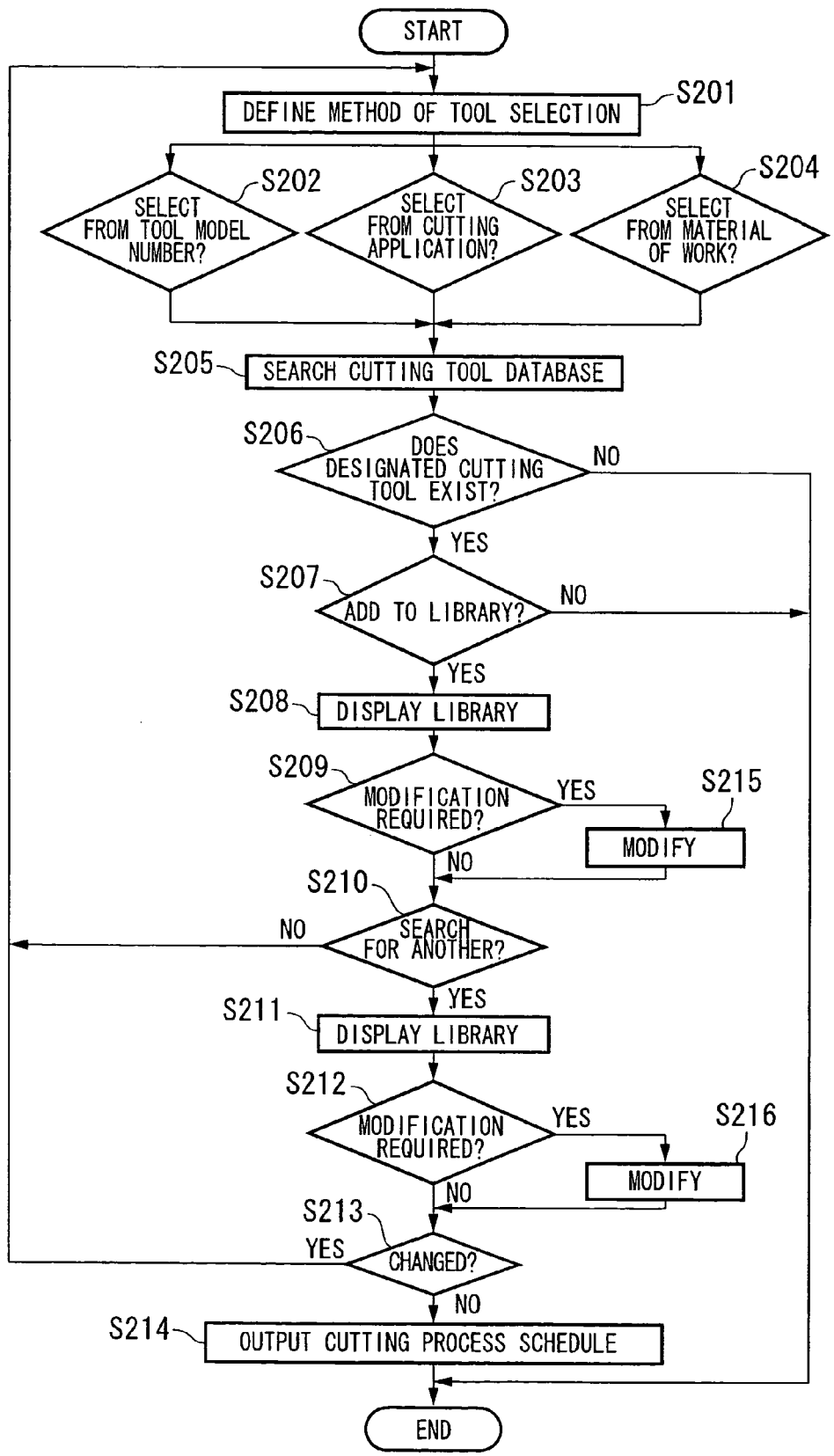
FIG. 2 is a flowchart to explain the operation of the embodiment of the present invention shown in FIG. 1.
Figure 3:
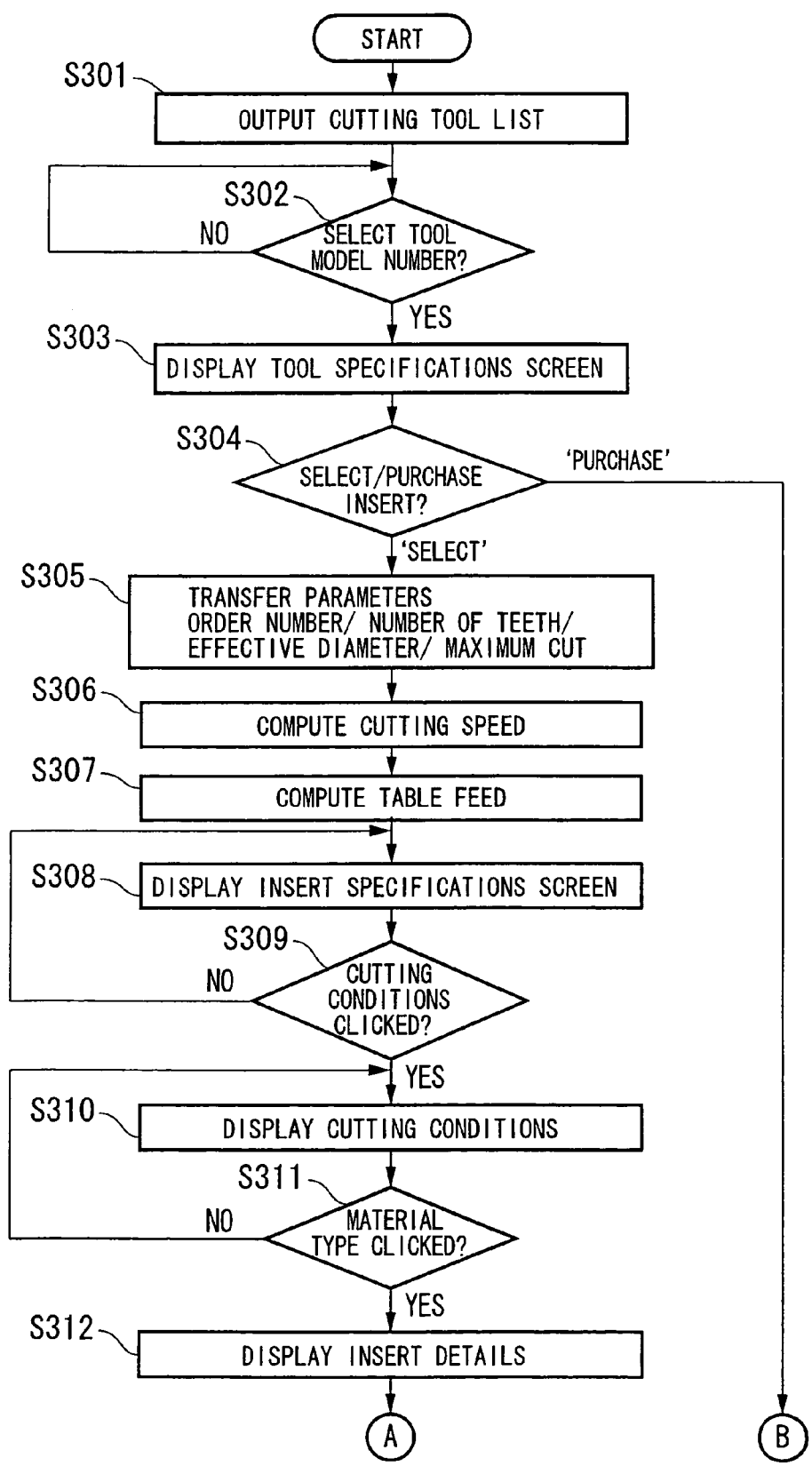
FIG. 3 is a flowchart to explain the operation of the embodiment of the present invention shown in FIG. 1.
Figure 4:
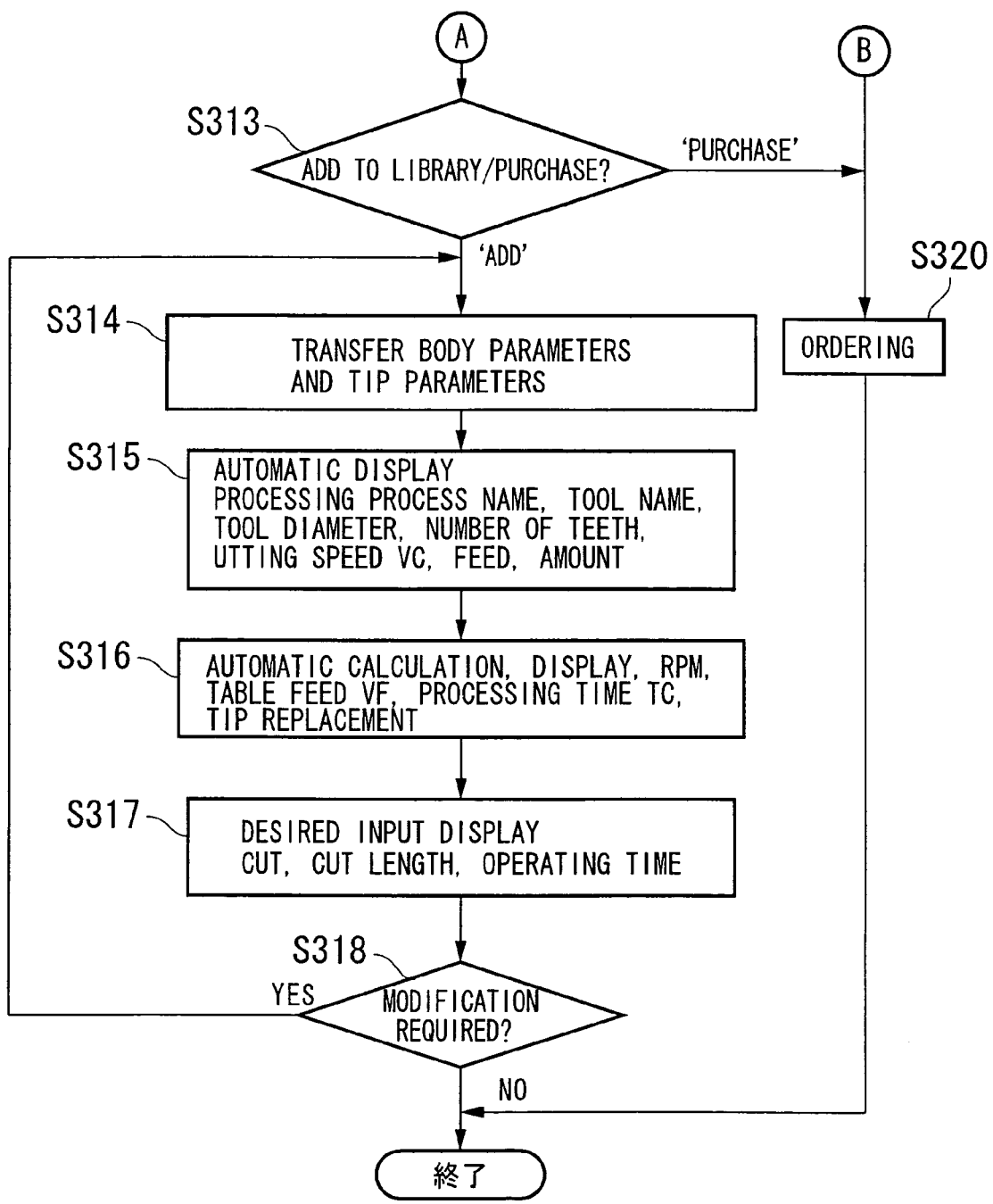
FIG. 4 is a flowchart to explain the operation of the embodiment of the present invention shown in FIG. 1.

FIG. 2 through FIG. 4 are flowcharts to explain the operation of the embodiment of the present invention shown in FIG. 1. More specifically these all show the processing procedures for the program for the preparation of tooling sheets of the present invention.

FIG. 5A through FIG. 12 are diagrams to explain the operation of the embodiment of the present invention. FIG. 5A through FIG. 11 show examples of display screen configurations, and FIG. 12 shows an example of a printed tooling sheet.

FIG. 2 shows the basic operation of the system for preparation of tooling sheets of the present invention. In FIG. 2, methods of selecting tools are previously defined in the system for preparation of tooling sheets 1, and operation of the user terminal 2 by the user is used to select one from the defined selection methods (step 201).

More specifically, as shown in FIG. 5A, one of external turning, boring, face milling, end milling, or drilling is selected.

Next, the search method is specified in order that the user is able to enter the search key. More specifically, this is selected from one of; the tool order number (step S202), the cutting purpose (step S203), and the material of the work (step S204).

When selecting from the tool order number, the user enters the desired order number in the entry field shown in FIG. 5B using the terminal equipment 2, and clicks on the search button. Moreover, when selecting from the cutting purpose, a cutting format in the selection box shown in FIG. 5C is selected, and an application shown in FIG. 5D selected. Face milling under general cutting is selected in the example in the diagram. Furthermore, when selecting from the material of the work, one of the workpieces shown in the selection box is selected as shown in FIG. 5. Stainless steel is selected in the example in the diagram.

The aforementioned selection operation is conducted interactively via communications networks 3 including the Internet and the like, between the cutting tool selection section 11 and the user terminal equipment 2. Moreover, subsequently, the term 'cutting tool' refers to, but is not limited to, the combination of the tool body, the insert, and the material of the insert.

The cutting tool DB 13 is searched by entering the search key (step S205) as noted above. Searching of he cutting tool DB 13 is conducted by the cutting tool DB search section 111 of the cutting tool selection section 11.

Search results are displayed on the user terminal equipment 2 as a list of search results as shown in the examples in FIG. 6A through FIG. 6D. The list of search results is displayed in groups for each product family, in a recommended order. In other words, consideration is given to display in a recommended order for the purpose of sales of new products and sales campaigns and the like. Here, a criteria of five steps (1–5) allocated for each product family is defined, with 1 being the highest, and 5 being displayed only when selected from the tool order number.

The product family, as in this example, is classified into the tool order numbers ASX445 and SE445. Furthermore, the order within the family is such that that the step keys 1–5 are allocated to each product. For example, the BAP300 series within the same family is classified into three types, namely the standard type, the lock-shaft type, and the long-insert type.

After searching the tools, a check is conducted to determine whether or not the designated tool exists (step S206). Details of 'Cutting tool search' and 'Add tool data' processing are shown in the flowcharts in FIG. 3 and FIG. 4.

In other words, following display of the list of search results (step S301), if the designated tool is available from the list of search results, the hyperlink for the tool order number is clicked (step S302). As a result the specifications screen (see FIG. 7) for the designated tool is displayed on the user terminal equipment 2 (step S303).

However, the recommended cutting conditions related to the cutting speed and the like are not determined in the tooling sheet 123, unless the insert is selected.

Then clicking on the 'Insert select' button allocated and displayed at the right edge in the center of the specifications screen for the designated cutting tool shown in FIG. 7 (step S304), transfers the parameters 'Order number', 'Number of teeth', Effective diameter', and 'Maximum cut' for the tool, to the tooling sheet section 12 by means of the parameter transfer section 112 (step S305).

When moving to direct purchase processing, clicking on the 'Purchase' button begins processing for the electronic acceptance and sending of orders (FIG. 4, step S320). Since electronic acceptance and sending of orders are not covered by the gist of the present invention, they are not explained in detail.

The 'Feed' and 'Main shaft revolution' parameters are required for using the designated cutting tool and operating the machine. The procedure for determining the table feed and main shaft revolution, following actual selection of the tool, is as follows.

In other words, at first the cutting speed (step S306) is determined. This requires that the tool body, the insert, and the insert material be determined. The main shaft revolution is computed with the equation (1) below. When cutting at a cutting speed Vc of 200 m/min and a cutter diameter of 50 mm, π=3.14, D=50, and Vc=200 are substituted in equation (1) to obtain a main shaft revolution of 1274 $min^{-1}$.

$$vc = \frac{\pi \cdot D \cdot n}{1000} \text{ (m/min)} \quad \text{Equation (1)}$$

vc (mm/min): Cutting speed

D (mm): Cutter diameter

π (3.14): Ratio of the circumference of a circle to its diameter n ($min^{-1}$): Main shaft revolution Next the table feed Vf (mm/min) is determined (step S307). The table feed is computed with equation (2) below. If the recommended feed per tooth is 0.15 mm/tooth, and if the number of teeth is 3, and the main shaft revolution is 1274 $min^{-1}$, the table feed speed Vf per minute is 573 mm/min.

$$vf = fz \cdot z \cdot n \text{ (mm/min)} \quad \text{Equation (2)}$$

vf (mm/min): Table feed speed per 1 minute fz (mm/tooth): Feed per tooth z: Number of teeth n ($min^{-1}$): Main shaft revolution As shown above, the items necessary to determine 'Main shaft revolution n' and 'Table feed vf' required to operate the machine are 'Cutting speed', 'Cutter diameter', 'Feed per tooth, and 'Number of teeth. Therefore the necessary parameters passed as data concerning the tool body are 'Cutter diameter' and 'Number of teeth'. 'Maximum cut' is used only for reference.

The insert drawing A on the screen in use for the designated tool shown in FIG. 7 is drawn in SCV (Scaleable Vector Graphics) format.

SVG is written in XML (eXtensible Markup Language), and the content of all files is in text format. Therefore a single SVG image is prepared for each family, so that for example, when a tool having a D1 (maximum outside diameter) of 63 mm is called. 63 is substituted in D1, and by simply using batch processing to display a file saved under another name, single image files can be displayed without preparing individual image files. Furthermore, when dimensions are changed as well, only the parameters are changed, and it is unnecessary to change the image.

FIG. 8 is the insert specification details screen displayed when the insert select button is clicked (step S308). Here, the insert having a breaker is shown. Here, clicking on the 'Cutting conditions' button at top-right, displays the cutting screen in FIG. 9 (steps S309, S310). Furthermore, clicking on the ● symbol (symbol 4 in FIG. 8) on the insert specification details screen, displays the insert specifications screen in FIG. 10 (steps S311, S312).

Then by clicking on the 'Add tool data' button at the right edge of the screen, data comprising both parameters for the previously selected tool body, and insert parameters, is entered in the tooling sheet preparation section 12 (steps S313 and S314).

Figure 11:
FIG. 11 is an example of a display screen to explain the operation of the embodiment of the present invention shown in FIG. 1.

Here, the library is a virtual memory stored in the user terminal equipment 2, or a cookie if the Internet is used, and is a copy of part of the recommended cutting conditions DB 14. Its format is shown in FIG. 11.

The tooling sheet displays the recommended cutting conditions for the selected cutting tool (tool body, the insert, and the insert material) in tabular format. More specifically the respective items of; the drawing, tool diameter, number of teeth, cutting speed, feed, revolution, table feed, depth of cut, cutting length, machining time, operating time, insert replacement, and price, are set for each cutting tool, output by the tooling sheet preparation section 12, and displayed on the user terminal equipment 2 via the communications network 3 including the Internet and the like, or printed. An example of a tooling sheet is shown in FIG. 12.

Of the aforementioned items, parameters of the process name, order number, tool diameter, number of teeth, cutting speed, feed, and price, are output automatically to the user terminal equipment 2 by the output control section 123 of the tooling sheet preparation section 12 (step S315). Furthermore, revolution, table feed, machining time, and insert replacement parameters computed by the computation section 122 of the tooling sheet preparation section 12 in accordance with the aforementioned procedure, are output via the output control unit 123 (step S316). Moreover, depth of cut, cutting length, and operating time parameters accepted as input as desired via the input acceptance section 121, are output by the output control section 123 (step S317).

The timing of insert replacement is determined by deriving a cutting time equivalent to the insert lifetime, from the cutting speed using a Taylor expansion.

More specifically, the cutting time Tc is obtained using the equation (3) computation below. In other words, if the face milling cutting conditions (Vc=160, f2=0.15, ap=1, VB=0.3, and the constants α and β) displayed in the library are substituted in equation (3), Tc is computed as 2587 minutes. Since the current process time is 62 minutes, insert replacement is currently not required.

$$vc \cdot ap^{\beta 1} \cdot fz^{\beta 2} \cdot Tc^{\beta 3} = \alpha \cdot VB^{\beta 4}$$

$$Tc = ((\alpha \cdot VB^{\beta 4})/(vc \cdot ap^{\beta 1} \cdot fz^{\beta 2}))^{(e/\beta 3)} \quad \text{Equation (3)}$$

vc (m/min): Cutting speed ap (mm): Depth of cut fz (mm/tooth): Feed per tooth

Tc (min): Processing time

α: Constant

VB (mm): Abrasion amount

β1–4: Constants

The user accessing the displayed library can change the recommended cutting conditions for the selected tool as desired using the user terminal equipment 2. In this case, 'Cutting speed' and 'Feed' are displayed automatically, however they can be changed as desired by the user. When a change in the conditions is required, the processing in step S314 and later is repeated, and for some items, the conditions are recomputed via the computation section 122 and reflected in the library via the recommended cutting conditions modification section 124.

It is also possible to change the order of, or delete, tools on the display screen by clicking on the tool order number. Furthermore, it is also possible to reselect by clicking on the tool order number. Moreover, orders are accepted and sent by clicking on the 'Purchase' button (step S320).

Returning to FIG. 2, since steps S206 through S209, and step S215, have been previously explained, an explanation is omitted here to avoid repetition.

In FIG. 2, if another tool is to be searched for, the processing in step S201 and later is repeated. The library is then displayed again and a check made to determine whether or not modifications have been made. If modification is required the aforementioned modification processing is implemented (step S216).

If modification is not required, a check is made to determine whether or not the tool combination has been changed (step S213). If modification is required, the processing in step S201 and later is repeated, and the recommended cutting conditions updated based on the selected cutting tool are added to the library by the cutting tool selection section 11, and reflected in the tooling sheet. Here, consideration may also be given to selection giving priority to insert cost, by selecting focusing on efficiency.

As explained above, in the present invention, the optimum cutting tool is selected interactively by the cutting tool selection section 11. Furthermore, tooling sheets using the selected cutting tools are created and output automatically by the tooling sheet preparation section 12.

In other words, in the present invention, the optimum cutting tool can be selected interactively by reflecting the recommended cutting conditions defined as defaults for the selected cutting tool, in the tooling sheet. Moreover, the tooling sheet using the selected cutting tool can be prepared automatically.

At this time, the cutting tools selection section 11 outputs a list of cutting tool search results obtained by searching the cutting tool DB 13 using at least one of the unique order number for each cutting tool, the cutting purpose, and the material of the work, as a search key, and parameters indicating the recommended cutting conditions for the designated tool are transferred to the tooling sheet preparation section 12 by making a declaration of intention of selecting a insert via the list of search results. Then the tooling sheet preparation section 12 generates and outputs tooling sheet item data for some items, by computation with a prescribed formula based on the transferred parameters.

As a result, the combination of the tool body, the insert, and the insert material are reflected in the recommended cutting conditions, and since the recommended conditions for the selected tools may be modified as desired in response to the conditions of use of the user, an accurate, interchangeable, and readily expandable system for preparation of tooling sheets can be provided.

In the aforementioned embodiment of the present invention, each procedure executed in the cutting tools selection section 11, the tooling sheet preparation section 12, the cutting tool DB search section 111, the parameter transfer section 112, the input acceptance section 121, the computation section 122, the output control section 123, and the recommended cutting conditions modification section 124 is recorded on a computer readable recording media, and the program recorded on this recording media read into a computer system and executed, thus implementing a system for the preparation of tooling sheets of the present invention.

The term 'computer system' employed here includes the operating system and hardware such as peripheral equipment and the like.

Furthermore, if the 'computer system' employs an Internet system, an environment for provision (or environment for display) of a web page is also included.

Moreover, 'computer readable recording media' includes portable media such as flexible disks, magneto-optical disks, ROMs, and CD-ROMs and the like, and memory devices such as hard disks and the like incorporated within computer systems. Furthermore, 'computer readable recording media' also includes systems wherein programs are sent via networks including the Internet and the like, communications circuits such as telephone circuits and the like, as well as media able to maintain a program for a fixed period of time as with volatile memory (RAM) and the like within a computer system acting as a client.

Moreover, the aforementioned program can also be transmitted from the computer system wherein it is stored in memory or the like, to other computer systems via a transmission media, or by transmitted waves in a transmission media. Here, 'transmission media' for transmitting the program refers to media having a function for the transmission of information such as a network (communications network) including the Internet and the like, and communications circuits (communications lines) such as telephone circuits and the like.

Furthermore, the aforementioned program can be such as to implement part of the aforementioned functions. Moreover, the aforementioned functions can also be implemented in combination with a program already recorded in a computer system, in other words, this may be a differential file (differential program).

The embodiment of the present invention has been described above in detail with reference to the drawings. However the specific configuration is not limited to this embodiment, and also includes designs and the like within a scope which does not depart from the gist of the present invention.

What is claimed is:

1. A system for the preparation of tooling sheets comprising a record of recommended cutting conditions for a cutting tool, the cutting tool comprising a combination of a tool body, an insert, and a material of the insert the system comprising:
    a cutting tool selection device configured to interactively select cutting tools in accordance with a cutting tool selection method; and
    a tooling sheet preparation device configured to define the recommended cutting conditions for the selected cutting tools as a default, to record the recommended cutting conditions and the cutting tools in the tooling sheet.

2. The system for the preparation of tooling sheets according to claim 1, wherein said tooling sheet preparation device comprises recommended cutting conditions which are updated by changing said cutting tools in said tooling sheet.

3. The system for the preparation of tooling sheets according to claim 1, wherein said cutting tool selection device comprises:
    a cutting tool database search device configured to search a cutting tool database using as a search key at least one of a unique order number for each of said cutting tools, a cutting purpose, or a material of the work, and to output a search result list for the cutting tools; and
    a parameter transfer device configured to transfer parameters indicating the recommended cutting conditions for designated cutting tools to said tooling sheet preparation device by making a declaration of intention to select the insert via said search results list.

4. The system for the preparation of tooling sheets according to claim 3, wherein said cutting tool database search device displays said search results in order, based on an nth step key allocated to each grouped family of cutting tools.

5. The system for the preparation of tooling sheets according to claim 1, wherein said tooling sheet preparation device comprises:
   a computing device configured to receive the transfer of the recommended cutting condition parameters via said parameter transfer device, and, depending on an item, to compute a prescribed formula to generate and output data to a tooling sheet.

6. The system for the preparation of tooling sheets according to claim 1, wherein said tooling sheet preparation device comprises a recommended cutting conditions modifying device configured to modify recommended cutting conditions for at least one of said selected cutting tools in response to conditions of use of a user.

7. A method for the preparation of tooling sheets comprising a record of recommended cutting conditions for a cutting tool, the cutting tool comprising a combination of a tool body, an insert, and an insert material are recorded, the method comprising:
   interactively selecting said cutting tool in accordance with a cutting tool selection method;
   defining the recommended cutting conditions for said selected cutting tool as a default; and
   recording the recommended cutting condition in said tooling sheet.

8. A computer program for the preparation of tooling sheets in a system for the preparation of tooling sheets comprising a record of recommended cutting conditions for a cutting tool, the cutting tool comprising a combination of a tool body, an insert, and an insert material are recorded, the computer program being on a tangible computer readable medium and, when executed, being configured to cause the computer to execute steps comprising:
   a cutting tool selection step for interactively selecting said cutting tool in accordance with a cutting tool selection method, and
   a tooling sheet preparation step for defining the recommended cutting conditions for said selected cutting tools as a default and recording the recommended cutting conditions in said tooling sheet.

9. The program for the preparation of tooling sheets according to claim 8, wherein said tooling sheet preparation step comprises a step for recording said recommended cutting conditions which are updated by changing at least one of said cutting tool in said tooling sheet.

10. The program for the preparation of tooling sheets according to claim 8, wherein said cutting tool selection step comprises:
    a cutting tool database search step for searching a cutting tool database using as a search key at least one of a unique order number for each of said cutting tools, a cutting purpose, or a material of the work, and outputting a search result list for the cutting tool; and
    a parameter transfer step for transferring parameters indicating recommended cutting conditions for a designated cutting tool to said tooling sheet preparation devices by making a declaration of intention to select an insert via said search results list.

11. The program for the preparation of tooling sheets according to claim 10, wherein said cutting tool database search step comprises a step for displaying said search results in order based on an nth step key allocated to each grouped family of cutting tools.

12. The program for the preparation of tooling sheets according to claim 8, wherein said tooling sheet preparation step comprises a step for receiving the transfer of said recommended cutting condition parameters, and depending on an item, computing a prescribed formula to generate and output data to a tooling sheet.

13. The program for the preparation of tooling sheets according to claim 8, wherein said tooling sheet preparation step comprises a step for modifying recommended cutting conditions for at least one of said selected cutting tools in response to conditions of use of a user.

* * * * *